United States Patent [19]

Graube

[11] 4,367,911
[45] Jan. 11, 1983

[54] METHOD AND ASSEMBLY FOR HOLOGRAPHIC EXPOSURE

[75] Inventor: Andrejs Graube, Marina del Rey, Calif.

[73] Assignee: Hughes Aircraft Company, Culver City, Calif.

[21] Appl. No.: 167,882

[22] Filed: Jul. 14, 1980

[51] Int. Cl.³ .............................................. G03H 1/02
[52] U.S. Cl. ..................... 350/3.61; 430/1; 430/2
[58] Field of Search .................. 350/3.61, 3.6 5, 3.6; 430/1, 2; 365/216; 369/103

[56] References Cited

U.S. PATENT DOCUMENTS

| | | | |
|---|---|---|---|
| 3,601,017 | 8/1971 | Glatzer et al. | 350/3.61 |
| 3,667,946 | 6/1972 | Sturdevant | 350/3.61 |
| 3,963,490 | 6/1976 | Graube | 350/3.61 |
| 4,036,647 | 7/1977 | Brault et al. | 430/2 |
| 4,173,474 | 11/1979 | Tanaka et al. | 430/1 |

Primary Examiner—John K. Corbin
Assistant Examiner—George P. Chambers
Attorney, Agent, or Firm—Allen A. Dicke, Jr.; W. H. MacAllister; A. W. Karambelas

[57] ABSTRACT

Assembly 10 is formed of base and cover plates 12 and the 16 with dichromated gelatin holographic exposure layer 20 therebetween. Liquid monomer is placed in the assembly and is polymerized to solid polymer layer 22 to form a solid assembly for holographic exposure of dichromated gelatin layer 20. After exposure, heating permits removal of cover plate 16 and polymer layer 22 for subsequent development of the latent image in dichromated gelatin holographic exposure layer 20.

16 Claims, 1 Drawing Figure

U.S. Patent  Jan. 11, 1983  4,367,911
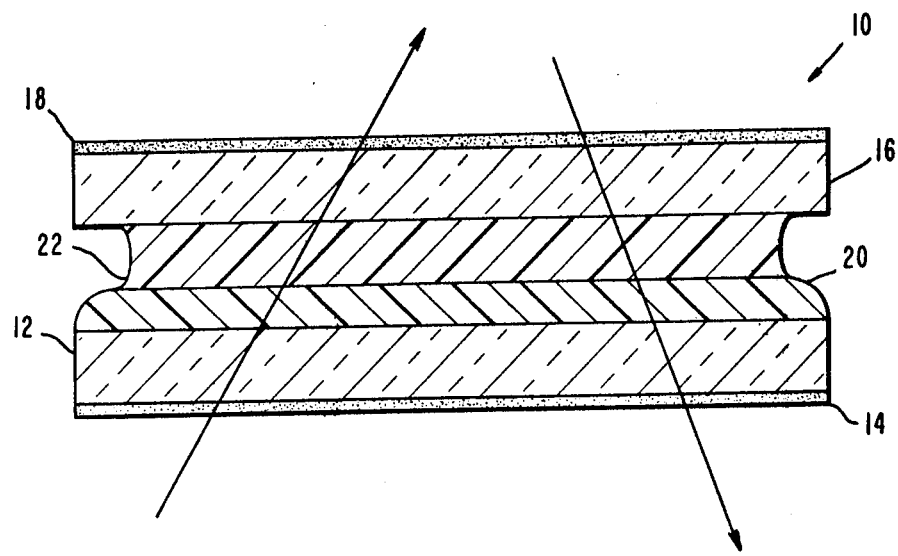

METHOD AND ASSEMBLY FOR HOLOGRAPHIC EXPOSURE

BACKGROUND OF THE INVENTION

This invention relates to a method and assembly for minimizing spurious interference effects and minimizing the recording of secondary gratings in the exposure of holograms to produce hologram optical elements. The assembly comprises a glass base plate, on which is supported a photosensitive holographic exposure material. The holographic material can be a gelatin based material, such as dichromated gelatin, silver halide emulsion, or diazo gelatin. On top of that is a glass cover plate. Both of the glass plates are anti-reflection coated. Sandwiched between the gelatin holographic exposure material and the cover plate is a solid, transparent and removable film which provides a rigid structure.

In the preparation of holographically exposed optical elements, it is desired to eliminate secondary gratings which are caused by reflections from adjacent optical surfaces. The secondary gratings cause ghost images or undesirable spectral flare in the exposed optical element and thus result in degradation of its performance. The responsible reflections can be minimized by putting the photosensitive gelatin holographic exposure material between anti-reflection coated glass. However, the glass pieces must be rigidly held in place during exposure. In the past, spurious interference patterns were eliminated by using very thick glass plates, when the exposure geometry would permit. A publication defining this system is found at T. A. Shankoff and R. K. Curran, "Efficient, High Resolution, Phase Diffraction Gratings", Applied Physics Letters 13, 239-241 (1968).

An index matching liquid is necessary between the upper glass plate and the gelatin exposure material, and unfortunately this system presents severe difficulties and limitations. For example, if the plates are stood up on edge, the index matching liquid has a tendency to run out and leave an air gap between the plates. Another difficulty appears in the dimensional instability of the two glass plates. If the cover plate moves in relation to the base plate on which the gelatin exposure material is mounted, the phase of the light passing through to the exposure material is changed. A phase change of 180° (or a plate movement of about ½ of a light wave length) can completely destroy the quality of the exposed hologram. Movement of the plates is very hard to prevent since the plates are usually held in place by two opposite forces: gravity and the surface tension of the index matching liquid between the two plates. Systems in which the plates are held together by a mechanical structure are subject to mechanical creep and instability.

Thus there is need for a method and assembly for holographic exposure so that holographic optical elements can be produced with minimized spurious gratings and with minimized exposure problems.

SUMMARY OF THE INVENTION

In order to aid in the understanding of this invention it can be stated in essentially summary form that is directed to a method and assembly for holographic exposure, for the exposure of photosensitive dichromated gelatin holographic exposure material with minimized spurious interference effects. This is accomplished by employing a fairly solid, transparent and removable film on the photosensitive dichromated gelatin holographic exposure material, between an anti-reflective coated base plate and an anti-reflective coated glass cover plate. The solid film holds the glass plates in position during exposure and can be released from the gelatin holographic exposure material after the latent image has been exposed.

It is thus an object of this invention to provide a method for exposure of holographic material to provide an image which is free of spurious interference effects by mounting the photosensitive dichromated gelatin holographic exposure material between two anti-reflection coated glass plates, together with a rigidizing solid, transparent film between the top of the photosensitive holographic exposure material and the glass cover plate to provide a rigid sandwich for optimum exposure conditions. The cover plate and the removable film are removed for development of the latent image in the holographic exposure material. It a further object to provide an assembly for such purposes.

Other objects and advantages of this invention will become apparent from a study of the following portion of this specification, the claims and the attached drawings.

BRIEF DESCRIPTION OF THE DRAWINGS

The single FIGURE of the drawings is a transverse section through the assembly for holographic exposure in accordance with this invention.

DESCRIPTION OF THE PREFERRED EMBODIMENT

The assembly for holographic exposure is generally indicated at 10 in the drawing. It comprises a rigid element such as glass base plate 12 with its anti-reflective bottom layer 14, together with a rigid cover element such as glass cover plate 16 with its anti-reflective top layer 18 and a layer 20 of photosensitive dichromated gelatin holographic exposure material and a solid, transparent, removable film 22 which forms the sandwich which is assembly 10.

Glass base plate 12 and glass cover plate 16 are conventional glass for this purpose, and each has its anti-reflective coating applied thereto, separately and prior to the sandwich formation of assembly 10. The application of the anti-reflective coatings as a separate step is necessary because of the high temperatures required for the application of a good anti-reflection coating. Thickness of the glass is not in itself important, but the glass should be thick enough to provide an interferometrically rigid support for both anti-reflection coatings and the photosensitive layer. The lateral size of the assembly is a function of the intended optical application, but should be large enough to prevent vignetting of the exposing laser beams.

The photosensitive dichromated gelatin holographic exposure material 22 is applied to the upper side of glass base plate 12, opposite the anti-reflective bottom layer 14.

In addition to its support function, plates 12 and and 16 may serve the additional function of preventing the transfer of water vapor to photosensitive exposure material layer 20.

Base plate 12 is thick enough to provide adequate support and thin enough to be substantially optically transmissive. Typical thicknesses range from about 1/10 to ¼ inch. Both of the glass plates are substantially transparent at least over the visible and near infrared regions so that for all of the optically transparent layers combined, the radiation transmitted to the photosensitive exposure material layer 20 should be at least 95% of the radiation incident on the surface of the outermost layer.

The photosensitive dichromated gelatin holographic exposure material layer 20 comprises emulsions of the group which utilize hydrophylic organic colloids as the emulsion vehicle, such as dichromated gelatin, photographic silver halide emulsion or diazo gelatin and other gelatin based photosensitive materials. The thickness of the photosensitive layer 20 ranges from about 1 to 100 microns as is well known. Generally, the thicker the layer, the more efficient in diffracting light. On the other hand, the thinner the layer the larger the viewable angle and the larger the spectral band width. Photosensitive layers for conventional holograms typically range from about 6–20 microns, as is well known. Layer 20 is sensitive to activic radiation, which is any radiation which causes exposure to produce a latent image.

After deposit of the photosensitive exposure material 20 on base plate 12, the film 22 is deposited thereon in liquid state. Thereupon, glass cover plate 16 is put in place and the film 22 is activated to cause it to solidify. The film 22 is defined in Example I below and is activated as described in the example.

EXAMPLE 1

Polysulfone is a photopolymer employed as the film 22. It more specifically contains 30–40% polyene, 60–70% polythiol and less than 3% photo-initiators and stabilizers. The material is an ester photopolymer laquer made by W. R. Grace and Co. under their trade name RCP 611-U. In the non-polymerized state, the monomer is laid on the material layer 20, the glass cover plate 16 is put in place and the monomer is polymerized. The polymerization of this photopolymer can be accomplished by any process that can form free radicals, such as ultraviolet light, electron beams, peroxide and thermal sources. For this utilization, ultraviolet light is suitable and the polymerization can be initiated with UV light in the 300 to 400 nanometer range. Peak sensitivity for polymerization is at 365 nanometers. The polymerization can be done in a few seconds to a few minutes, depending on conditions, such as UV light intensity, film thickness, and spectral quality of the light source. This exposure causes cross-linking of the monomer to cause a polymerized solid film 22. This exposure also causes a small amount of cross-linking in the photosensitive material when a dichromated gelatin material is used. However, the exposure is minimal.

The photosensitive dichromated gelatin holographic exposure material is exposed to an actinic interference pattern to record the latent image thereon. The interference pattern may be generated by a diffuse object, one or more point light sources, or other suitable sources which provide the desired coherent wave fronts employing techniques known in the art. Assembly 10 shows the two exposing laser beam wavefronts entering the layers from opposite sides of the structure, as would be the case in a reflection hologram geometry. The beams could also enter the structure from the same side, forming a transmission hologram. In either case, the index matching material of the instant invention would work equally well.

After exposure of the photosensitive dichromatic gelatin holographic exposure material layer 20 by blue-green laser light to form a latent image with developable characteristics in the layer 20, the cover plate 16 and the film 20 are removed. This is accomplished by raising the temperature of the solid polymer film layer 22 to about 80° C. With this heat treatment the polymer layer 22 loses its adhesion and softens slightly and easily separates from the gelatin film layer 20.

After separation, the latent image in the photosensitive layer is then developed by methods known in the art to obtain the recorded image. In the case of a photosensitive layer comprising dichromated gelatin, an aqueous solution, followed by dehydration with an alcohol is generally used to develop the latent image in the photosensitive layer.

Thereupon, a protective layer is formed on the developed layer 20. The protective layer includes a layer of moisture barrier material in order to protect the developed material layer 20 against degradation effects due to the penetration of the water vapor. The protective layer may be a glass layer with an anti-reflective coating.

The finished product is a holographic optical element. Such are finding a variety of uses, including helmet-mounted displays such as described in U.S. Pat. No. 3,928,108, eye protection reflectors for laser radiation, and novelty displays such as pendant jewelry.

This invention has been described in its presently contemplated best mode and it is clear that it is susceptible to numerous modifications, modes and embodiments within the ability of those skilled in the art and without the exercise of the inventive faculty. Accordingly, the scope of this invention is defined by the scope of the following claims.

What is claimed is:

1. An assembly for exposure of a photosensitive material, said assembly comprising:
   a rigid base element;
   a photosensitive material layer mounted on said base element;
   a rigid cover element above said photosensitive material layer, at least one of said elements being substantially optically transparent; and
   a solid synthetic polymer composition material between said photosensitive material layer and said cover element to form a rigid assembly.

2. The assembly of claim 1 wherein said substantially transparent rigid element is glass, having an anti-reflective coating thereon on the side away from said photosensitive material layer.

3. The assembly of claim 1 wherein both of said rigid elements are made of substantially optically transparent glass having an anti-reflective coating thereon on the side opposite said photosensitive layer.

4. The assembly of claim 1 wherein said photosensitive layer is a gelatin base material.

5. The assembly of claim 1 wherein said photosensitive layer is dichromated gelatin material.

6. The assembly of claim 1 wherein said photosensitive layer is dichromated gelatin material for the preparation of a holographic optical element or hologram.

7. The asssembly of claim 1 wherein said solid synthetic polymer composition material layer is a polysulfone which is solidified in place.

8. The assembly of claim 7 wherein said photosensitive layer is a gelatin base material.

9. The assembly of claim 7 wherein said photosensitive layer is dichromated gelatin material for the preparation of a holographic optical element or hologram.

10. The assembly of claim 9 wherein said substantially transparent rigid element is glass, having an anti-reflective coating thereon on the side away from said photosensitive material layer.

11. An assembly for exposure of a photosensitive material, said assembly comprising:
 a rigid base element;
 a photosensitive material layer mounted on said base element;
 a rigid cover element above said photosensitive material layer, both of said elements being made of substantially optically transparent glass having an anti-reflective coating thereon on the side opposite said photosensitive material layer;
 a solid synthetic polymer composition material between said photosensitive material layer and said cover element to form a rigid assembly.

12. An assembly for exposure of a photosensitive material, said assembly comprising:
 a rigid base element;
 a photosensitive dichromatic gelatin material layer mounted on said rigid base element for the preparation of a holographic optical element or a hologram;
 a rigid cover element above said photosensitive material layer, at least one of said elements being a substantially transparent rigid glass element having an anti-reflective coating thereon on the side away from said dichromated gelatin photosensitive material layer a solid synthetic polymer composition material between said photosensitive material layer and said cover element to form a rigid assembly;

13. The method of forming an assembly for exposure of a holographic optical element or hologram comprising the steps of:
 providing a rigid base plate;
 coating a photosensitive material layer on the rigid base plate;
 coating a liquid monomer layer onto the photosensitive material layer;
 placing a rigid transparent cover plate onto the liquid monomer layer; and
 polymerizing the liquid monomer layer to form a solid polymer layer to form a firm assembly for holographic exposure.

14. The method of claim 13 wherein the polymerization of the liquid monomer step is a photo-polymerization step and includes exposure of the monomer layer to actinic radiation.

15. The method of forming an assembly for exposure of a holographic optical element or a hologram comprising the steps of:
 providing a rigid base plate;
 coating a photosensitive material layer on the rigid base plate;
 coating a liquid monomer layer onto the photosensitive material layer;
 applying a transparent rigid cover plate;
 photopolymerizing the liquid monomer layer by exposure of the monomer layer to actinic radiation to form a solid polymer layer;
 holographically exposing the photosensitive layer to form a latent image;
 removal of the transparent rigid cover plate and polymer layer; and
 development of the latent image in the photosensitive layer to form a holographic optical element or hologram.

16. The method of claim 15 further including the step of covering the developed holographic optical layer.

* * * * *